United States Patent [19]
Patrick

[11] Patent Number: 4,736,293
[45] Date of Patent: Apr. 5, 1988

[54] INTERLEAVED SET-ASSOCIATIVE MEMORY

[75] Inventor: David M. Patrick, Aurora, Ill.

[73] Assignee: American Telephone and Telegraph Company, AT&T Bell Laboratories, Murray Hill, N.J.

[21] Appl. No.: 599,644

[22] Filed: Apr. 11, 1984

[51] Int. Cl.⁴ ............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,967,247 | 6/1976 | Andersen et al. | 340/172.5 |
| 4,056,845 | 11/1977 | Churchill, Jr. | 364/200 |
| 4,195,340 | 3/1980 | Joyce | 364/200 |
| 4,195,342 | 3/1980 | Joyce et al. | 364/200 |
| 4,208,716 | 6/1980 | Porter et al. | 364/200 |
| 4,315,312 | 2/1982 | Schmidt | 364/200 |
| 4,317,168 | 2/1982 | Messina et al. | 364/200 |
| 4,371,928 | 2/1983 | Barlow et al. | 364/200 |
| 4,371,929 | 2/1983 | Brann et al. | 364/200 |
| 4,378,591 | 3/1983 | Lemay | 364/200 |
| 4,381,541 | 4/1983 | Baumann, Jr. et al. | 364/200 |
| 4,392,201 | 7/1983 | Brown et al. | 364/200 |
| 4,424,561 | 1/1984 | Stanley et al. | 364/200 |
| 4,439,829 | 3/1984 | Tsiang | 364/200 |
| 4,493,026 | 1/1985 | Olnowich | 364/200 |
| 4,525,780 | 6/1985 | Bratt et al. | 364/200 |

OTHER PUBLICATIONS

K. Hwang and F. A. Briggs, "Computer Architecture and Parallel Processing", (McGraw-Hill, 1984 pp. 102-109) (McGraw-Hill, Jul. 15, 1981), pp. 7-46 to 7-48.

Primary Examiner—Gary V. Harkcom
Assistant Examiner—Randy W. Lacasse
Attorney, Agent, or Firm—David Volejnicek

[57] ABSTRACT

In a processing system (10) comprising a main memory (102) for storing blocks (150) of four contiguous words (160) of information, a cache memory (101) for storing selected ones of the blocks, and a two-word wide bus (110) for transferring words from the main memory to the cache, the cache memory is implemented in two memory parts (301, 302) as a two-way interleaved two-way set-associative memory. One memory part implements odd words of one cache set (0), and even words of the other cache set (1), while the other memory part implements even words of the one cache set and odd words of the other cache set. Storage locations (303) of the memory parts are grouped into at least four levels (204) with each level having a location from each of the memory parts and each of the cache sets. The cache receives a block over the bus in two pairs of contiguous words. The cache memory is updated with both words of a word pair simultaneously. The pairs of words are each stored simultaneously into locations of one of either of the cache sets, each word into a location of a different memory part and of a different level. Cache hit check is performed on all locations of a level simultaneously. Simultaneously with the hit check, all locations of the checked level are accessed simultaneously.

24 Claims, 11 Drawing Sheets

INTERLEAVED SET-ASSOCIATIVE MEMORY

TECHNICAL FIELD

This invention is directed to processing system memories, and in particular concerns realization of processing system interleaved set-associative cache memories with a minimum of memory parts.

BACKGROUND OF THE INVENTION

In processing systems, typically a main memory stores information for use by the central processing unit (CPU). The operating speed of the CPU is generally significantly greater than that of the main memory. Hence processing systems commonly utilize a cache memory as an interface between the main memory and the CPU. The cache memory is a fast memory, whose operating speed better matches that of the CPU. The cache memory stores selected contents of the main memory, such as information that was most recently requested by the CPU, which the CPU is likely to request in the near future.

When the CPU requests information to be read from memory, the request goes to the cache memory, which checks to determine whether it contains the requested information. If so, the cache supplies the information to the CPU; if not, the cache requests the information from the main memory and upon receipt both stores it and supplies it to the CPU. Similarly, when the CPU requests new information to be written to memory, the cache memory checks to determine whether it contains the old memory information that is to be overwritten. If so, the cache memory generally stores the new information in place of the old and either immediately or at some time thereafter also writes the new information into the main memory; if not, the cache memory either writes the new information into the main memory, or it requests from the main memory the old information, stores it, and then proceeds as if it had contained the old information.

Information transfers between the main memory and the cache memory are often done in units of information called blocks. A block is a predetermined plurality of consecutive main memory locations, or words. The information contents of a block are likewise referred to as a block, with the understanding that it is the information contents of memory locations, and not the locations themselves, that are transferred.

To improve the speed of block transfers in the processing system, the main memory and communication buses connecting the main memory with other devices, such as the cache memory, are often capable of transferring more than one word of information simultaneously. For the same purpose, the cache memory is often interleaved. An interleaved memory is one comprising a plurality of memory parts which are capable of being read or written simultaneously. For purposes of this application, the term memory part refers to one or more memory devices functioning together to produce one-word-wide storage. For example, a memory part for 32-bit words may be made up of four 8-bit-wide memory devices.

Words simultaneously received by interleaved memory are simultaneously stored in different ones of the memory parts. Likewise, words that are to be simultaneously transmitted by the interleaved memory are simultaneously retrieved from different ones of the memory parts. An interleaved cache memory therefore can receive and store a plurality of words simultaneously.

Interleaving of cache memory has been expensive, because of the multiplicative increase in the number of memory parts and associated circuitry, such as reading, writing, and addressing circuitry, that has been required in order to implement the interleaved memory. For example, two way interleaving, to allow simultaneous storage and retrieval of two words, has required the use of two memory parts and duplication of the associated circuitry; three way interleaving, to allow simultaneous storage and retrieval of three words, has required the use of three memory parts and triplication of the associated circuitry; and N-way interleaving has required the use of N memory parts, each with its own associated circuitry.

In the prior art, this problem has been especially acute for set-associative cache memories. A set-associative cache memory is one wherein any one memory word may be stored in any one of a plurality of predetermined cache memory locations. Each of these predetermined memory locations is a member of a different set. Hence there are as many sets as there are different locations in which a given memory word may be stored in the cache. Increasing the number of locations in which a word may be stored increases the chance of a particular word being found stored in the cache memory, and hence increases the effectiveness of the cache in speeding up system operation. But in order for a set-associative cache to operate rapidly, all of the predetermined locations in which a given word may be stored must be examined at the same time for the presence of a desired word. For this purpose, each set is commonly implemented in a different memory part, and the plurality of memory parts are accessed in parallel. Hence in a set-associative memory there commonly are at least as many memory parts as there are sets. And when a set associative memory is interleaved, commonly each of the memory parts and its associated circuitry are replicated in the manner described above for interleaved memory. Thus, if an M-way set-associative cache memory, i.e., one having M sets, is N-way interleaved, it typically comprises at least $M \times N$ memory parts. While these increases in the number of memory parts provide added performance, by increasing the cache size, such increases in the numbers of required parts quickly become excessive, making the use of interleaved set-associative cache memories uneconomical for most applications.

SUMMARY OF THE INVENTION

It is these and other disadvantages of the prior art that the invention is directed to solving. Specifically according to the invention, an interleaved set-associative cache memory is constructed such that each memory part of the cache memory implements portions of a number of cache sets. Generally according to the invention, the memory locations that make up the plurality of memory parts of a memory such as a cache are grouped into a plurality of storage levels such that a given word of information is storable in any location of a level, and preferably in no other location. Each level includes a location of each memory part. The memory also has an arrangement for simultaneously storing a plurality of words of information into locations each belonging to a different memory part. And the memory further includes an arrangement for simultaneously checking all locations of a level for presence therein of a desired word. In this way, interleaving can be achieved for a set-associative memory such as a cache without using any more memory parts than in a conventional set-associative memory of the same storage capacity. The number of memory parts needed to implement an interleaved set-associative memory is thereby significantly reduced in comparison to the conventional implementation of such a memory.

Preferably, the simultaneously-stored words are contiguous words of information such as contiguous words of main memory, and they are stored by the storing arrangement into locations each not only of a different memory part but also of a different level. Further preferably, each level has a plurality of words associated therewith, and each location of a level may store any word of the words associated with that level. In this case the storing arrangement simultaneously stores each word of a plurality of words into a location of the word's associated level and of a different memory part.

Preferably, the memory includes an arrangement for simultaneously accessing all locations of a level. This accessing arrangement is preferably operative simultaneously with the checking arrangement, for simultaneously accessing all locations of the checked level.

Advantageously, the invention increases the update rate of a cache memory to the rate of data transfers to the cache from main memory over a multi-word-wide bus, but does so without generally increasing the number of memory parts required to implement the cache memory. In particular, in a set-associative cache memory the number of memory parts is either not increased at all or is increased only to the width, measured in words, of the bus, depending on the number of ways of set associativity of the cache memory. Since the invention allows interleaving of a set-associative cache memory without increasing the number of memory parts required to implement the cache memory over that required to implement conventional cache memories of the same capacity, the invention enhances performance without added cost.

The increased update rate of a cache memory of this invention on average decreases the cache memory's bus occupancy, thereby freeing more time on the bus for other users. Another advantage of increased cache update rate is a reduction in the amount of time that the cache memory is busy updating. This frees more of the cache memory's time for other activities, such as responding to CPU read and write requests. The CPU is therefore less likely to have to wait for the cache memory to complete updating itself before it can respond to a CPU request, and system performance is thereby improved.

The invention furthermore increases the cache update rate to the bus data transfer rate without increasing the time required to access the desired word in the cache memory in the instance of a cache hit. Rather, cache memory accesses and the performance of the hit check are allowed to occur simultaneously, in parallel, thereby resulting in a fast cache hit memory access time. Thus cache performance is not degraded in any way, but is only improved, as a result of this invention.

These and other advantages and features of the present invention will become apparent from the following description of an illustrative embodiment of the invention, taken together with the drawing.

DETAILED DESCRIPTION

Figure 1:
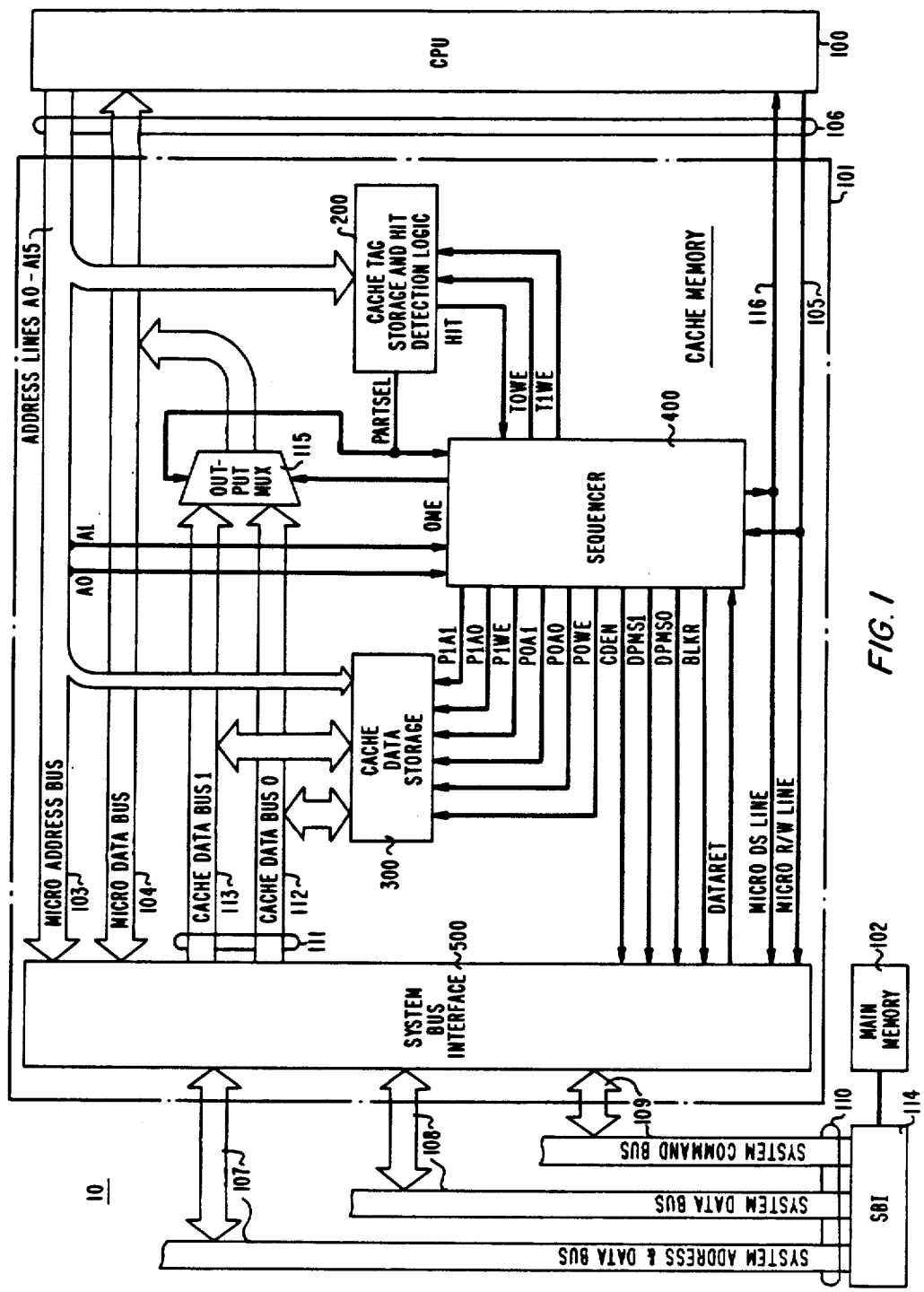
FIG. 1 is a block diagram of a processing system including a cache memory embodying an illustrative example of the invention.

Turning now to the drawing, there is shown in FIG. 1 a data processing system 10 comprising a central processing unit (CPU) 100, a cache memory 101, and a main memory 102 interconnected by communication buses.

The CPU 100 is any conventional and suitable processor. It is the center of intelligence of the system 10, performing computational and logical functions and executing system tasks with the aid of other parts of the system 10. In particular, the CPU 100 executes program instructions upon data, both of which it obtains from memory.

The main memory 102 is any conventional information storage unit. The main memory 102 is capable of storing or retrieving the contents of at least two words of memory simultaneously. For this purpose the main memory 102 may be an interleaved memory. Such memories are known to the art. The main memory 102 stores information, such as data and program instructions, for use by other system units, in particular for use by the CPU 100. Such information will henceforth be referred to collectively as data.

The cache memory 101 is a high-speed memory that contains selected contents of the main memory 102. In particular, the cache memory 101 contains data that are likely to be needed soon by the CPU 100. These may include blocks of data to which the CPU 100 has recently referred and instructions which the CPU 100 has recently used as well as instructions subsequent thereto in the instruction stream.

The cache memory 101 comprises cache data storage 300 and cache tag storage and hit detection logic 200. The cache data storage 300 is the memory portion of the cache 101 that stores the selected contents of the main memory 102. The cache data storage 300 is discussed in greater detail in conjunction with FIG. 5. The cache tag storage and hit detection logic 200 identifies the main memory addresses of the data words that are stored in the data storage 300 and determines whether a particular word is contained in the data storage 300. The tag storage and hit detection logic 200 is discussed in greater detail in conjunction with FIG. 4.

The cache memory 101 also includes a sequencer 400. The sequencer 400 is a conventional type of circuit. It controls the operation of the cache memory 101, issuing control signals to other parts of the cache memory 101 to cause them to perform required actions at appropriate times. For this purpose, the sequencer 400 is connected to other parts of the cache memory 101 by various signal lines. The sequencer 400 is discussed in greater detail in conjunction with FIG. 7.

The CPU 100, the cache memory 101, and the main memory 102 are interconnected for communication by conventional communication buses. For communicating with other parts of the system 10, the main memory 102 is interfaced to a system bus 110. A system bus interface 114 interfaces the main memory 102 to the system bus 110. The interface 114 is a conventional device which ensures that communications of the main memory 102 on the bus 110 are orderly and follow the protocol of the bus 110.

The system bus 110 includes a system address and data bus 107, a system data bus 108, and a system command bus 109. The system data bus 108 is used for transferring in parallel the bits, i.e., bit values, of a word of memory. The system address and data bus 107 is used for address and data transfers in a time shared manner. At the start of a bus 110 transaction, the bus 107 is used for transferring the bits of a memory address. Thereafter, if the bus transaction involves the transfer of more than one word of memory, the bus 107 is used for transferring in parallel the bits of a memory word. Hence the bus 110 is capable of transferring in parallel the bits of either one or two memory words.

The system command bus 109 is used to transfer commands, such as system bus 110 access requests and grants and memory read and write requests, among the various devices that are connected to the bus 110. In particular, for purposes of this application, the system command bus 109 is used to indicate whether the word, or block of words, of the main memory 102 identified by the address on the system address and data bus 107 is to be read or written.

A micro bus 106 connects the CPU 100 to the cache memory 101. The micro bus 106 also indirectly connects the CPU 100 to the system bus 110 and hence to the main memory 102, through the cache memory 101 via a system bus interface 500. The interface 500 interfaces communications between the micro bus 106 and the system bus 110, inter alia converting communications from the protocol of the one bus to the protocol of the other bus, and ensures that communications are transferred between the buses 110 and 106 in an orderly manner. In this respect, the interface 500 operates in a conventional manner akin to that of the interface 114. Further functions and structure of the interface 500 are discussed in conjunction with FIG. 6.

The micro bus 106 includes: a micro address bus 103 for transferring in parallel the bits of a memory address from the CPU 100 to the cache memory 101, and therethrough to the system bus 109; a micro data bus 104 for transferring in parallel the bits of a memory word from the CPU 100 to the interface 500 of the cache memory 101, and therethrough to the system bus 110, and vice versa; a micro read and write (R/W) line 105 for transferring CPU 100 read and write requests to the cache memory 101, and therethrough to the system bus 110; and a micro data strobe (DS) line 116 for indicating when data signals on the micro data bus 104 are valid and hence ready to be received by an interested device. The bus 106 may include other buses and lines as well.

A cache bus 111 connects the interface 500 with the cache data storage 300. The cache bus 111 may be thought of as an extension of the micro data bus 104. This is because data from the micro data bus 104 are brought to the cache memory 101 by the cache bus 111, via the interface 500, and because data received by the interface 500 over the system bus 110 are conducted by the cache bus 111 to the cache data storage 300 and also to the micro data bus 104 for transmission to the CPU 100.

The cache bus 111 comprises a cache data bus0 112 and a cache data bus1 113, each for transferring in parallel the bits of one memory word. The cache data buses 112 and 113 are interfaced to the micro data bus 104 by an output multiplexer 115 of the cache memory 101. The output multiplexer 115 is a conventional multiplexer. It serves to selectively connect one of the cache data buses 112 and 113 to the micro data bus 104.

With respect to the cache memory 101, the system 10 of FIG. 1 functions as follows. The CPU 100 reads a word of memory by placing the address of the desired word on the micro address bus 103 and placing a READ signal on the micro R/W line 105. The interface 500 receives the READ signal but substantially does not respond thereto. The sequencer 400 of the cache memory 101 also receives the READ signal. It responds thereto by enabling the output multiplexer 115.

The cache tag storage and hit detection logic 200 receives the address from the micro address bus 103 and determines therefrom if the desired word is presently stored in the cache data storage 300. If the cache data storage 300 contains the word, the cache tag storage and hit detection logic generates a HIT signal. The sequencer 400 responds thereto by causing the cache data storage 300 to send the word through the output multiplexer 115 onto the micro data bus 104 for transmission to the CPU 100.

If the cache data storage 300 does not contain the desired word, the cache tag storage and detection logic 200 fails to generate a HIT signal. The sequencer 400 responds thereto by causing the system bus interface 500 to request over the system bus 110 from the main memory 102 a block of four words that include the desired word. Actions undertaken by the interface 500 in response thereto include gating the address from the micro address bus 103 onto the system address and data bus 107 and generating a BLOCK READ signal on the system command bus 109.

The main memory 102 responds to the block read request by sending the requested four-word block to the cache memory 101. The block transfer is accomplished in two successive transfers each of a double-word, i.e., of two words in parallel, over the buses 107 and 108. The interface 500 latches the four received words and transfers them in two double-word transfers over the cache bus 111 to the cache data storage 300 for storage therein. The double word that includes the requested word is transferred last to the cache data storage 300. While the double word that includes the requested word is being transferred to the cache data storage 300, the output multiplexer 115 is caused to gate the requested word onto the micro data bus 104 for transmission to the CPU 104.

The CPU 100 writes a word of memory by placing the address of the desired word on the micro data bus 104, and placing a WRITE signal on the micro R/W line 105. Both the sequencer 400 and the interface 500 of the cache memory 101 receive the WRITE signal. The interface 500 responds by writing the word into the main memory 102 over the system bus 110. Actions undertaken by the interface 500 in response to the WRITE signal include gating the word's address from the micro address bus 103 onto the system address and data bus 107, gating the data that is to be written from the micro data bus 104 onto the system data bus 108, and generating a WRITE signal on the system command bus 109.

Meanwhile, the cache tag storage and hit detection logic 200 receives the address from the micro address bus 103 and determines therefrom if the desired word is presently stored in the cache data storage 300.

If the cache data storage 300 contains the word, the cache tag storage and hit detection logic generates a HIT signal. The sequencer 400 responds thereto by causing the interface 500 to couple the micro data bus 104 to the cache bus 111. The data that is to be written in the desired word is thus channeled from the bus 104 to the cache data storage 300. The sequencer 400 then causes the cache data storage 300 to receive the word and store it.

If the cache data storage 300 does not contain the desired word, the cache tag storage and hit detection logic 200 does not generate a HIT signal, and the sequencer 400 responds by returning the cache memory 101 to an idle state, i.e., causing the cache memory 101 to do nothing. The contents of the cache data storage 300 are not modified in any way.

Figure 2:
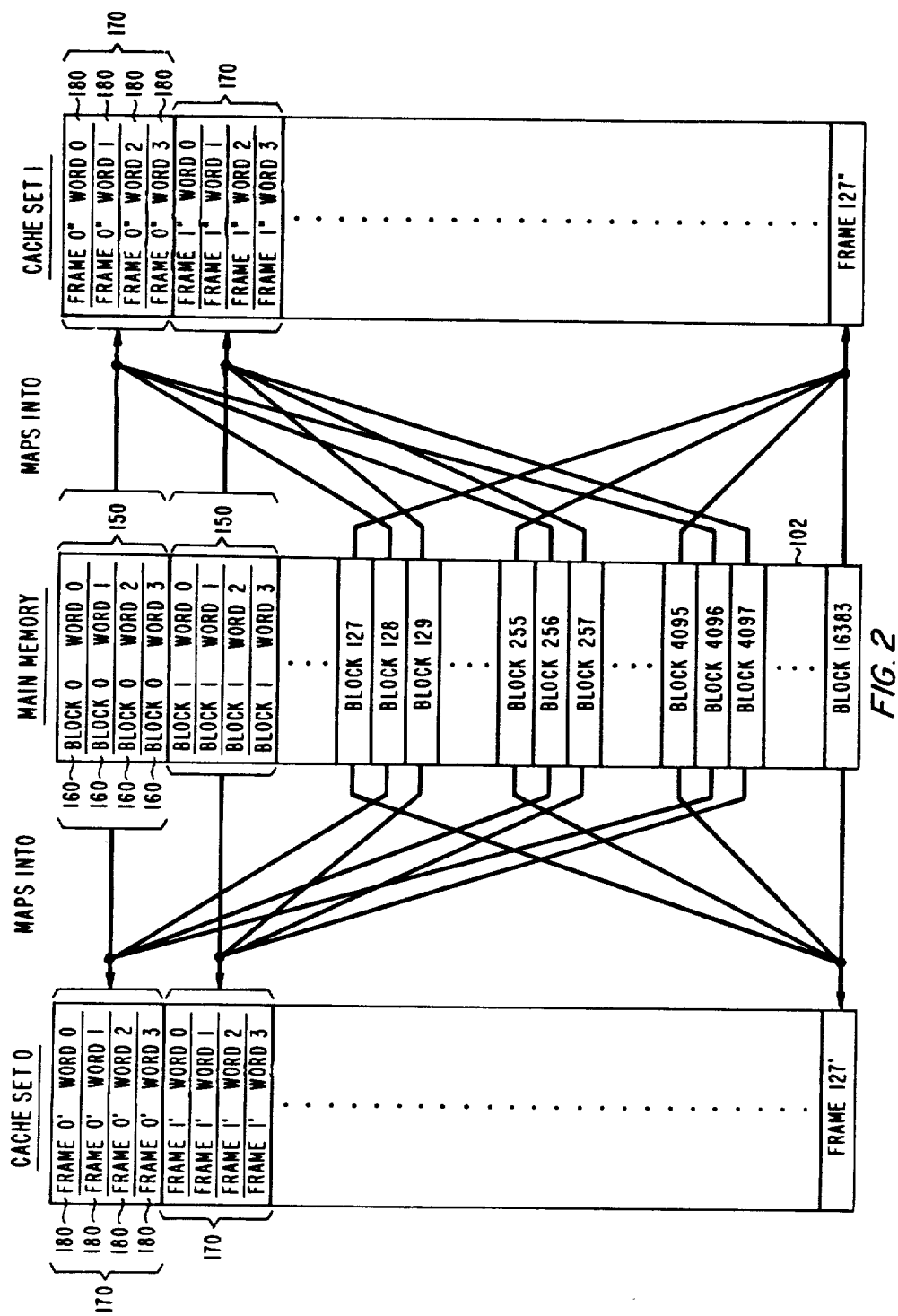
FIG. 2 is a block diagram of the logical organization of the cache memory of FIG. 1 vis-a-vis that of the main memory of FIG. 1.

Before discussing in further detail the structure of the cache memory 101, it is instructive to consider the logical organization of the cache memory 101 vis-a-vis that of the main memory 102. For this purpose, attention is drawn to FIGS. 2 and 3. As FIG. 2 shows, the main memory 102 is logically subdivided into a plurality of blocks 150 each comprising four words 160 of memory. In the illustrative example of FIG. 2, the main memory 102 is shown as comprising 16384 blocks 150 numbered from 0 to 16383. The four words 160 of each block 150 are numbered 0 through 3. The blocks 150 and the words 160 may represent either physical memory, i.e., memory locations, or virtual memory, i.e., portions of the address spectrum that is associated with the main memory 102 and that programs may refer to. In order to include both alternatives in further discussion, further references to the main memory 102 are in terms of its contents, and the contents are referred to as blocks 150 and words 160.

In a parallel manner, the cache data storage 300 of the cache memory 101 is logically subdivided into a plurality of frames 170, each comprising four words 180. In the illustrative example of FIG. 2, the cache data storage 300 is shown as comprising two sets of 128 frames 170. The frames 170 of one cache set, referred to as cache set 0, are numbered 0' through 127'. The frames of the other cache set, referred to as cache set 1, are numbered 0'' through 127''. The words 180 of each frame 170 are numbered from 0 to 3.

The blocks 150 of the main memory 102 are mapped into the frames 170 of the cache data storage 300, and each word 160 of a block 150 is mapped into a word 180 of a frame 170. That is, a plurality of blocks 150 of the main memory 102 is associated with each frame 170 of the cache memory 101; and each word 160 of an associated block 150 is associated with a different word 180 of the associated frame 170. When transferred from the main memory 102 to the cache memory 101, a block 150 may only be stored in an associated frame 170. The cache memory 101 is a 2-way set-associative memory, comprising the cache sets 0 and 1. Each block 150 has associated therewith two frames 170, one in each cache set 0 and 1. Hence a block 150 may be stored in either one of the two associated frames 170 in the cache memory 101. As shown in the example of FIG. 2, words 0-3 of block 0 of the main memory 102 may be stored in words 0-3, respectively, of either frame 0' of the cache set 0 or frame 0'' of the cache set 1. And words 0-3 of block 1 of the main memory 102 may be stored in words 0-3, respectively, of either frame 1' of the cache set 0 or frame 1'' of the cache set 1. Similarly, blocks 2-127 of the main memory 102 are associated with the frames 2' and 2'' through 127' and 127'', respectively, of the cache memory 101. Blocks 128-255 of the main memory 102 are again associated with the frames 0' and 0'' through 127' and 127'', respectively, of the cache memory 101;

blocks 256–383 of the main memory 102 are likewise associated with the frames 0' and 0" through 127' and 127", respectively, of the cache memory 101; and so on.

Figure 3:
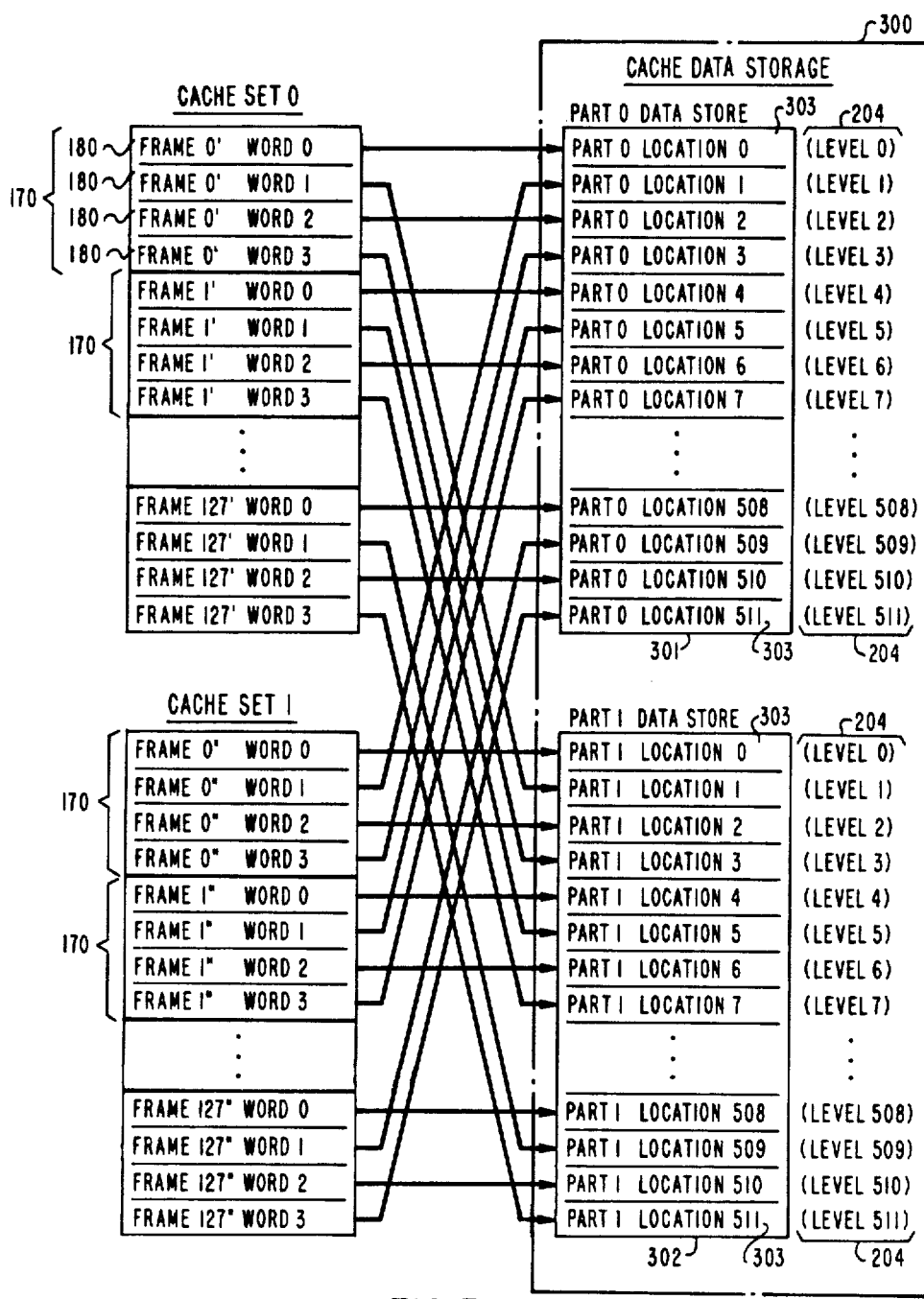
FIG. 3 is a block diagram of the implementation of the logical organization of FIG. 2 of the cache memory of FIG. 1.

The frames 170 and words 180 of the cache sets 0 and 1 of FIG. 2 are logical constructs. Physically, they are implemented in the manner shown in FIG. 3. As FIG. 3 shows, the cache data storage 300 comprises two memory parts 301 and 302, also referred to as part0 data store 301 and part1 data store 302. The memory parts 301 and 302 are each constructed of one or more physical storage devices that together store words of information. The memory parts 301 and 302 are not each dedicated to one of the cache sets 0 and 1. Rather, the memory parts 301 and 302 together form the storage space for storing the words 180 of the cache sets 0 and 1, and each part 301 and 302 includes words 180 from both cache sets 0 and 1. Each memory part 301 and 302 comprises a plurality of storage locations 303. Each location 303 is of sufficient width to store one word 180 of a cache frame 170. In the example of FIG. 3, each memory part 301 and 302 is shown comprising 512 locations, numbered 0 through 511.

The mapping, or association, of words 180 of cache frames 170 with locations 303 of the memory parts 301 and 302 is as follows. Location 0 of part0 data store 301 represents word 0 of frame 0'. Location 0 of part1 data store 302 represents word 0 of frame 0". Location 1 of part0 data store 301 is word 1 of frame 0". Location 1 of part1 data store 302 is word 1 of frame 0'. Location 2 of part0 data store 301 is word 2 of frame 0". Location 2 of part1 data store 302 is word 2 of frame 0". Location 3 of part0 data store 301 is word 3 of frame 0". And location 3 of part1 data store 302 is word 3 of frame 0'. Similarly, locations 4 and 6 of part0 data store 301 and locations 5 and 7 of part1 data store 302 represent words 0, 2, 1, and 3, respectively, of frame 1'. And locations 4 and 6 of part1 data store 302 and locations 5 and 7 of part0 data store 301 represent words 0, 2, 1, and 3, respectively, of frame 1". The words 180 of other frames 170 of the cache sets 0 and 1 are represented by other locations 303 of the memory parts 301 and 302 in a similar manner.

The locations 303 of the memory parts 301 and 302 are logically grouped into a plurality of levels 204. A level 204 comprises all cache locations 303 in which a given memory word 160 may be stored. Each level 204 comprises those locations 303 of both memory parts 301 and 302 that can store a particular main memory word 160. Hence a level 204 comprises the locations 303 that represent corresponding words 180 of both cache sets 0 and 1, i.e., locations 303 that represent a particular word 180 of a particular frame 170 of both cache sets 0 and 1. The locations 303 of a level 204 are simultaneously accessible. As will be made clear from the discussion of FIG. 5, the locations 303 that are included in a level 204 are addressed by the same address and are accessed—addressed, retrieved, and placed on the cache data bus 111—simultaneously.

As FIG. 3 shows, the locations 303 of the memory parts 301 and 302 are grouped into 512 levels numbered 0 through 511. The grouping is such that zeroth level comprises zeroth locations of both parts 301 and 302; first level comprises first locations of both parts 301 and 302; and so on until 511th level comprises 511th locations of both parts 301 and 302.

It can be seen from FIG. 3 that the cache memory 101 is both interleaved and set-associative. The cache memory 101 is two-way set associative in that it comprises two cache sets 0 and 1 either one of which can store a block 150 of the main memory 102. The cache memory 101 is two-way interleaved in that the words 160 of a block 150 are distributed over two memory parts 301 and 302 such that adjacent words 160 of a block 150 lie in different memory parts 301 and 302 and hence may be written in the cache memory 101 simultaneously, as will be shown below. Significantly, both the two-way interleaving and the two-way associativity are achieved by using only two memory parts. And furthermore, the cache frame words 180 that can store a particular main memory word 160 are grouped in the same level 204 and hence both of the cache frame words are accessed simultaneously by one address.

Figure 4:
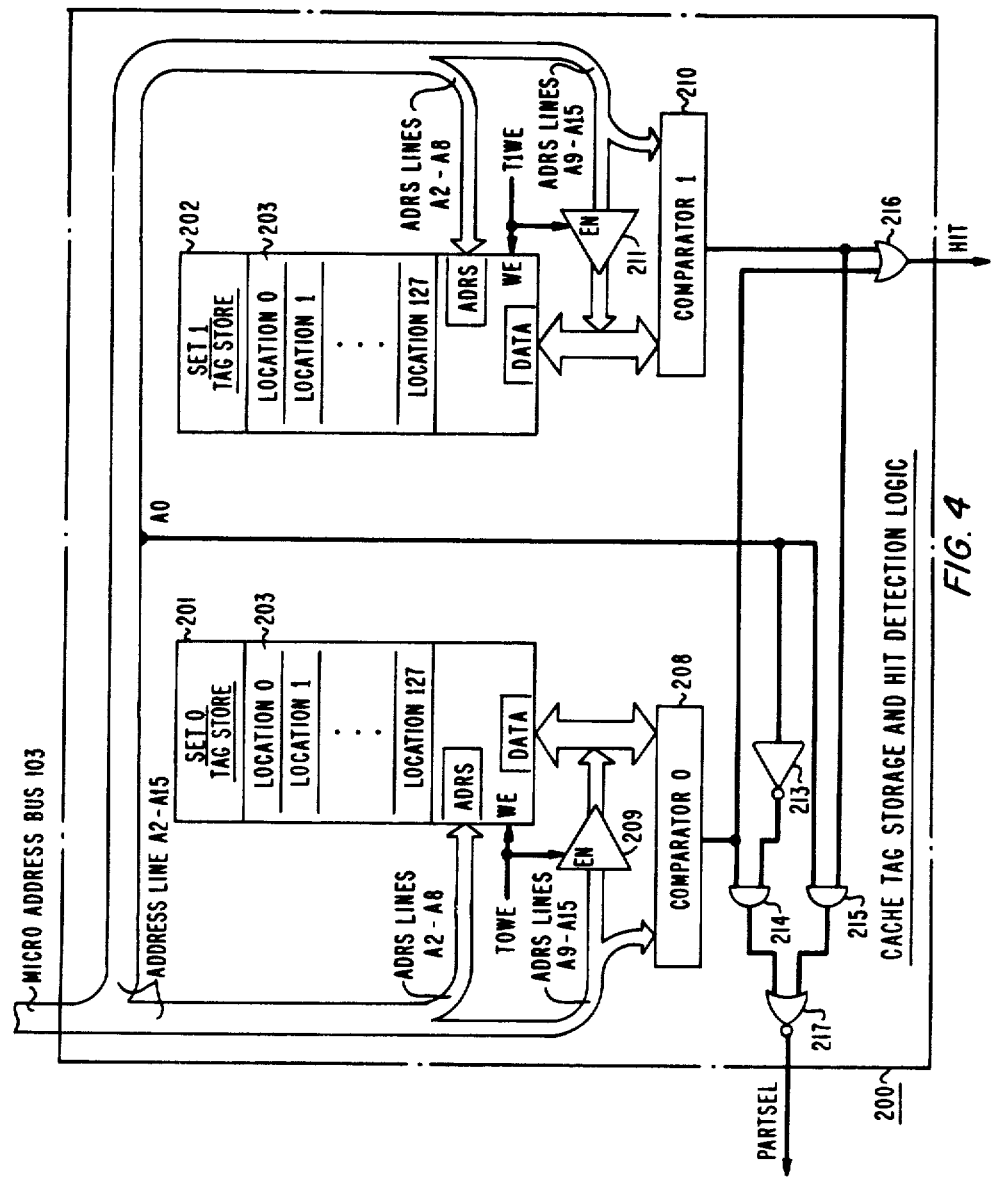
FIG. 4 is a block diagram of the cache tag storage and hit detection logic of the cache memory of FIG. 1.

Returning to consideration of the structure of the cache 101 which implements the above-described logical configuration, reference is made to FIGS. 4–7. FIG. 4 shows the cache tag storage and hit detection logic 200. As was mentioned above, the cache 101 is 2-way set associative, comprising the cache sets 0 and 1: therefore the cache tag storage and hit detection logic 200 includes two tag stores 201 and 202, one for each cache set 0 and 1. The set0 tag store 201 is associated with the cache set 0 while the set1 tag store 202 is associated with the cache set 1. Each tag store 201 and 202 identifies the block 150 contents of the associated one of the cache sets 0 and 1.

Each tag store 201 and 202 is a memory of as many storage locations 203 as there are frames 170 in the associated cache set 0 and 1, respectively. Hence, in this example, each tag store 201 and 202 comprises 128 storage locations 203 numbered 0 through 127. Each location 203 of a tag store 201 and 202 is associated with one frame 170 of the associated cache set 0 and 1, respectively. The contents of a location 203 identify the current contents of the associated frame 170. In particular, a tag location 203 stores a portion of the address of the block 150 that is currently stored in the associated frame 170.

In the example of FIG. 2, a 16-bit address is required to uniquely identify each word 160 of 16384 four-word blocks 150. The two least significant bits of the address memory identify the particular word 160 within a block 150, so a block address is 14 bits wide. Of these 14 bits, the least significant 7 bits uniquely identify each of the locations 203 of a tag store 201 or 202. Hence the 7 most significant bits of a block address form the tag, i.e., the contents of a tag location 203, in the example of FIG. 4.

Each tag store 201 and 202 has an address (ADRS) input port, a write enable (WE) input, and a DATA input and output port. The micro address bus 103 comprises 16 address bit lines A0–A15, one for each bit of an address of a word 160, and the ADRS input ports of the tag stores 201 and 202 are connected to the bit lines A2 through A8. These bit lines carry the third through ninth least significant bits of the address, which bits identify a location 203 in each of the tag stores 201 and 202. The DATA input and output port of the tag store 201 is connected to one input port of a comparator 208; it is also connected, via a conventional gate 209, to the bit lines A9 through A15 of the micro address bus 103. These bit lines carry the 7 most significant bits of the address of a word 160, which bits form the tag. The bit lines A9 through A15 of the micro address bus 103 are also connected to a second input port of the comparator 208. An enable (EN) input of the gate 209 and the WE input of the tag store 201 are connected to a tag store0 write enable (T0WE) signal line from the sequencer 400 (see FIG. 1).

In a similar manner, the DATA input and output of the tag store 202 is connected to one input port of a comparator 210 and, via a gate 211, to the bit lines A9 through A15 of the micro address bus 103. The bit lines A9 through A15 of the micro address bus 103 are also connected to a second input port of the comparator 210. An enable (EN) input of the gate 211 and the WE input of the tag store 202 are connected to a tag store1 write enable (T1WE) signal line from the sequencer 400 (see FIG. 1).

The output of the comparator 208 is connected to an input of an AND gate 214 and to an input of an OR gate 216. Similarly, the output of the comparator 210 is connected to an input of an AND gate 215 and a second input of the OR gate 216.

The second input of the AND gate 215 is connected to bit line A0 of the micro address bus 103. The bit line A0 is also connected through an inverter 213 to the second input of the AND gate 214. The outputs of the AND gates 214 and 215 are connected to inputs of NOR gate 217, whose output is connected to a memory part select (PARTSEL) signal line that connects to and controls the output multiplexer 115 of the cache memory 101 (see FIG. 1). The PARTSEL signal line also forms an input to the sequencer 400.

Determination of whether a desired word is stored in the cache memory 101, i.e., whether a cache hit has occurred, is made in the following manner. The third through ninth least significants bits of the address of the desired word form an offset address into the tag stores 201 and 202. These address bits are conducted by bit lines A2 through A8 of the micro address bus 103 to the ADRS inputs of the tag stores 201 and 202. In each of the tag stores 201 and 202 these address bits identify, i.e. address, one of the locations 203. When the T0WE and T1WE signal lines are deasserted, i.e., idle, the contents of the location 203 thus addressed in each tag store 201 and 202 appear at the DATA port of that tag store, and are input to the comparators 208 and 210. At the comparators 208 and 210 the contents of these two locations 203 are compared with the 7 most significant bits of the address of the desired word, which bits are conveyed to the comparators by the address bit lines A9 through A15 of the micro address bus 103. If either comparator indicates a match, i.e., a hit, it sets high, or to logical "1" level, its output. Because of the organization of the cache data storage 300 shown in FIG. 3, the hit check is thus performed simultaneously on all locations 303 of a level 204 of the cache data storage 300.

Setting high by either comparator 208 or 210 of its output causes the OR gate 216 to generate a cache HIT signal on the HIT line to the sequencer 400. And in conjunction with the address bit value on the bit line A0 of the micro address bus 103, setting high of a comparator output port also produces an appropriate PARTSEL signal that indicates in which of the two memory parts 301 and 302 the desired word 160 is stored. The value of the least significant bit of the desired word's address, conducted by the address bit line A0, indicates whether the desired word is an even word 160, i.e. word 0 or 2 of a block 150, or and odd word 160, i.e. word 1 or 3 of a block 150. The least significant address bit value of "0" indicates an even word, and the value of "1" indicates an odd word. If a match was detected by comparator 208, indicating a hit of cache set 0, and the least significant address bit is zero, indicating an even word 160, the resulting PARTSEL signal, as generated by the components 213–217, is low, or logical "0", to indicate that the desired word 160 is stored in part0 data store 301 of the cache data storage 300 (see FIG. 5). If comparator 208 indicates a hit of cache set 0 and the least significant address bit is one, indicating an odd word 160, the resulting PARTSEL signal is high, or logical "1", to indicate that the desired word is stored in part1 data store 302. If comparator 210 indicates a hit of cache set 1 and the least significant address bit indicates an even word 160, the resulting PARTSEL signal is again high to indicate that the desired word is stored in part1 data store 302. And if comparator 210 indicates a hit of cache set 1 and the least significant address bit indicates an odd word 160, the resulting PARTSEL signal is low to indicate that the desired word is stored in part0 data store 301. This scheme is consistent with the implementation of the cache sets 0 and 1 as pictured in FIG. 3 and discussed above.

If neither comparator 208 and 210 produces a hit, the HIT line is not set high within a predetermined period of time and the PARTSEL line remains low. This indicates a cache miss, i.e., that the desired word 160 is not in the cache memory 101. If the miss occurs on a read request, the cache memory 101 must be updated. That is, the block 150 that includes the desired word 160 must be brought into and stored in the cache memory 101. Hence the tag stores 201 and 202 of the cache tag storage and hit detection logic 200 must be updated as well with the tag of the newly-stored block 150.

The update of the tag stores 201 and 202 is accomplished in the following manner. The sequencer 400 first selects which of the cache sets 0 and 1 it wishes to place the new block 150 into. The sequencer 400 then asserts the appropriate one of the tag store write enable lines T0WE and T1WE. Assertion of the T0WE or T1WE line causes the one of the gates 209 and 211 that is connected thereto to open and gate address bits from the address bit lines A9–A15 to the DATA port of the associated tag store 201 or 202. The WE input of that associated tag store 201 or 202 also detects the assertion of the associated T0WE or T1WE signal line, and the tag store responds by storing the address bit values carried by the address bit lines A9–A15 as the new tag. The new tag is stored in the location 203 that is addressed by the bit values on the address bit lines A2–A8. The contents of the location 203 bearing the same address in the other, unselected, tag store remain unaffected.

Figure 5:
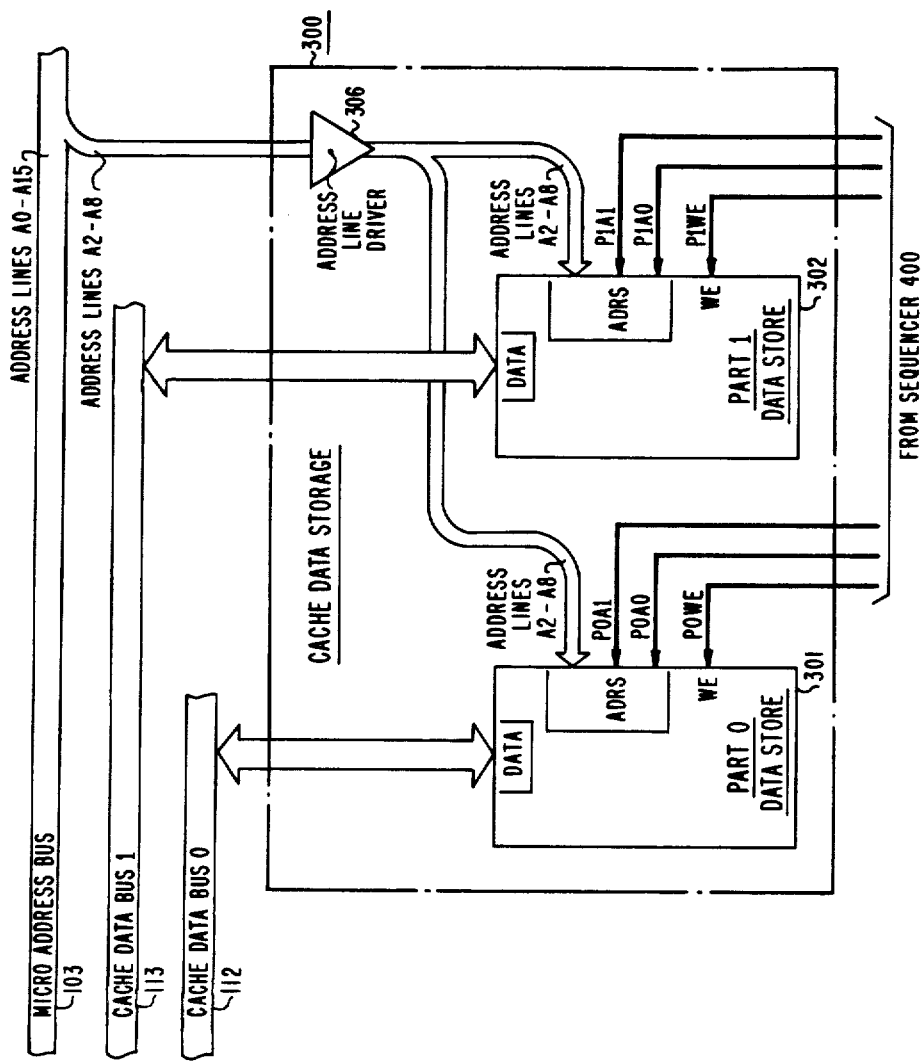
FIG. 5 is a block diagram of the cache data storage of the cache memory of FIG. 1.

FIG. 5 shows the structure of the cache data storage 300. As was mentioned above, the cache data storage 300 comprises two memory parts 301 and 302. Each of the memory parts 301 and 302 has an address (ADRS) input port connected, through an address line driver 306, to the address bit lines A2 through A8 of the micro address bus 103. The ADRS port of the memory part 301 further connects to part0 least significant address bit (P0A0) and part0 second least significant address bit (P0A1) signal lines leading from the sequencer 400. The ADRS port of the memory part 302 further connects to part1 least significant address bit (P1A0) and part1 second least significant address bit (P1A1) signal lines leading from the sequencer 400. Each of the memory parts 301 and 302 also has a write enable (WE) input and a DATA input and output port. The WE input of memory part 301 is connected to part0 write enable (P0WE) line from the sequencer 400, and the WE input of memory part 302 is connected to part1 write enable (P1WE) line from the sequencer 400. The DATA port of the memory part 301 is connected to the cache data bus0 112 and therethrough to one input port of the output multiplexer 115 of the cache memory 101 (see FIG. 1). And the DATA port of the memory port 302 is connected to the cache data bus1 113 and therethrough to a second input port of the output multiplexer 115.

Each memory part 301 and 302 is logically configured in the manner shown in FIG. 3 and discussed above. Hence the memory part 301 contains storage locations 303 representing all of the even words 180 of frames 170 of cache set 0 and all of the odd words 180 of frames 170 of cache set 1. The memory part 302 contains storage locations 303 representing all of the even words 180 of frames 170 of cache set 1 and all of the odd words 180 of frames 170 of cache set 0. And the pair of locations 303, one from each memory part 301 and 302, representing corresponding words 180 of the cache sets 0 and 1 form the same addressing level 204. As will be made clearer below, this positioning of the even, odd, and corresponding words 180 allows pairs of words 160 of a block 150 to be written into the cache memory 101 simultaneously, and yet allows both locations 303 that can store a particular word 160 to be accessed simultaneously, without dedicating two memory parts for use by each cache set.

Words 160 are stored in and retrieved from the cache data storage 300 in the following manner. As in the case of the tag stores 201 and 202, the address bit lines A2 through A8 supply to the ADRS input port of each of the memory parts 301 and 302 the address of the frame 170 that may contain the block 150 that includes the desired word 160. In memory part 301, signal lines P0A1 and P0A0 select the word 180 within the addressed frame 170 that may hold the desired word 160. In the memory part 302, this task is performed by the signal lines P1A1 and P1A0. When the CPU 100 is accessing the cache memory 101, either to read or to write a word 160 therein, the sequencer 400 sets the signal value on the signal lines P0A1 and P1A1 to equal the value of the second least significant bit of the desired word's address, obtained from the address line A1 of the micro address bus 103. The sequencer 400 also sets the signal value on the signal lines P0A0 and P1A0 to equal the value of the least significant bit of the desired word's address, obtained from the address line A0. When the cache memory 101 is being updated with a block 150 from the main memory 102, the sequencer 400 sets the signal value on the signal lines P0A1 and P1A1 to equal the complement of the second least significant bit of the desired word's address during the first part of the update, when the double-word not containing the desired word 160 is being written into the data stores 301 and 302. During the second part of the update, the sequencer 400 sets the signal value on the signal lines P0A1 and P1A1 to equal the second least significant bit of the desired word's address. Throughout the update, the sequencer 400 sets the signal value on the signal line P0A0 to zero and on the signal line P1A0 to one if set 0 is being updated; the signal value on the signal line P0A0 is set to one and on the signal line P1A0 to zero if set 1 is being updated.

Except in the case of a CPU 100 write request, words 160 are written into and read out of the memory parts 301 and 302 in pairs, one word per each memory part 301 and 302. On a CPU 100 write request, one word 160 is written into one of the memory parts 301 and 302. During cache updates, both P0WE and P1WE signal lines are asserted simultaneously by the sequencer 400 to enable the simultaneous writing of both memory parts 301 and 302. The words 160 that are to be written will have been placed on the cache data bus0 112 and cache data bus1 113 by the interface 500, and the memory parts 301 and 302 each accept the word from the respective bus 112 or 113 and write it in the addressed location 303. During a cache read, both P0WE and P1WE signal lines are deasserted to enable the reading of both memory parts 301 and 302. The memory parts 301 and 302 respond by outputting the contents of the addressed locations 303 at their DATA ports onto the cache data bus0 112 and the cache data bus1 113, respectively.

During a cache write by the CPU 100, if a cache hit occurs, either P0WE or P1WE is asserted by the sequencer 400, depending on which memory part is indicated to be holding the word 160 that is to be written. This indication is given to the sequencer 400 by the signal value on the PARTSEL signal line. The word 160 that is to be written will have been placed on both the cache data bus0 112 and the cache data bus1 113 by the interface 500 under the control of the sequencer 400. But only the memory part 301 or 302 whose write enable input is asserted takes the word from the associated bus and writes it in the addressed location 303.

Figure 6:
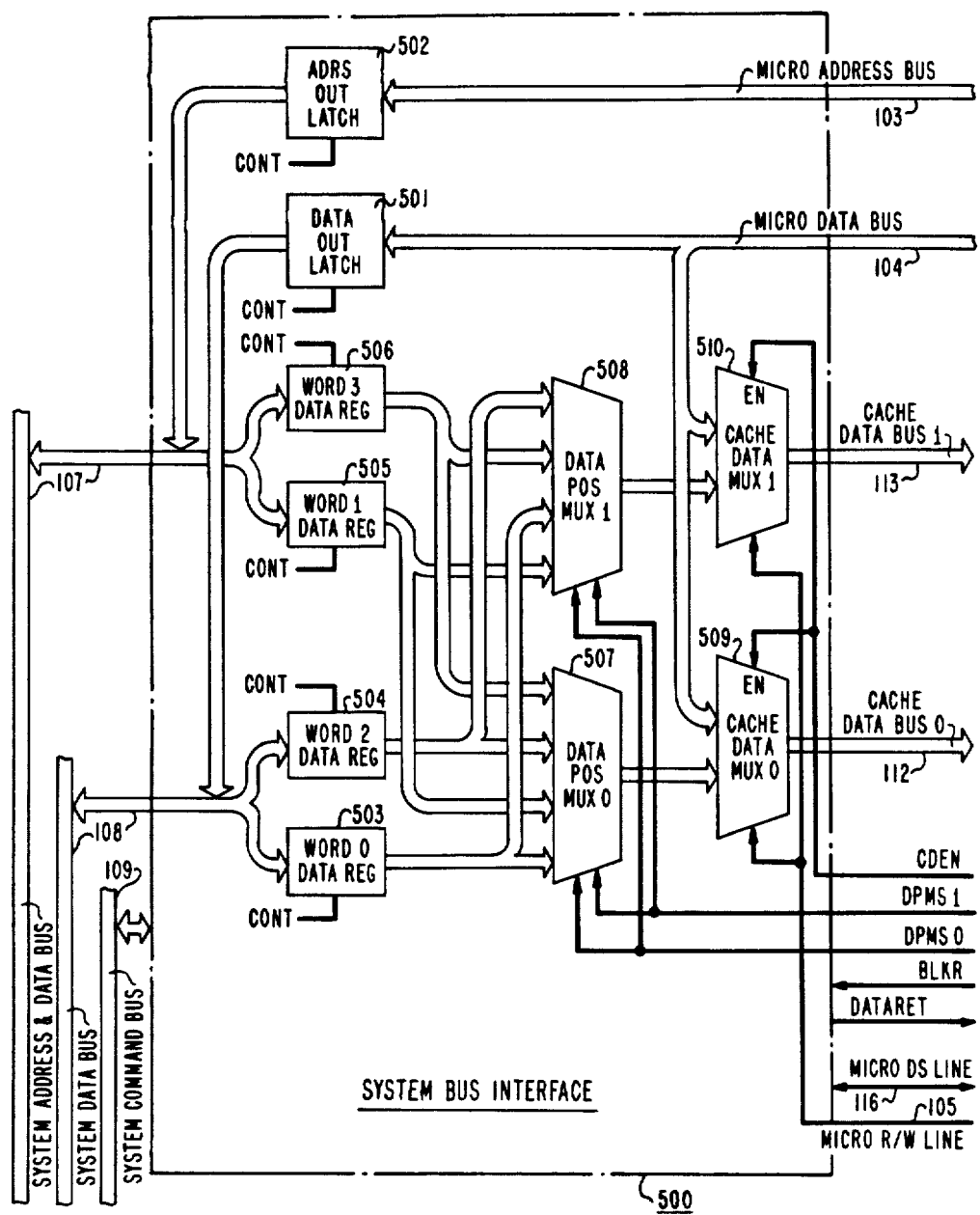
FIG. 6 is a block diagram of the system bus interface of the cache memory of FIG. 1.

FIG. 6 shows the configuration of the system bus interface 500. FIG. 6 shows only those portions of the interface 500 which are related to the invention and mark a departure from a conventional bus interface. The interface 500 generally includes other circuitry besides that which is shown in FIG. 6, such as circuitry required to properly follow the communication protocol of the micro bus 106 and of the system bus 110. Such circuitry is conventional and is a function of the characteristics of the particular buses 106 and 110 that are used.

As shown in FIG. 6, inside the interface 500 the micro data bus 104 is connected through a data out latch 501 to the system data bus 108. The data out latch 501 is a conventional latch register. When commanded to do so, it latches signal values appearing at its input port, and upon command displays the latched signal values at its output port. The micro data bus 104 is also connected to an input port of a cache data multiplexer0 509 and to an input port of a cache data multiplexer1 510. Each multiplexer 509 and 510 is a conventional multiplexer that, upon command received over the micro R/W line 105, selects signal values appearing at one of its input ports for output at its output port. The multiplexers 509 and 510 are enabled and disabled via signals sent over a cache data enable (CDEN) line which is connected to their enable (EN) inputs.

The micro address bus 103 is connected inside the interface 500 through an address out latch 502 to the system address and data bus 107. Like the data out latch 501, the address out latch 502 is also a conventional latch register.

The system data bus 108 is also connected to input ports of a word0 data register 503 and a word2 data register 504. These registers are also conventional latch registers. The output port of the word0 data register 503 is connected to an input port of a data position multiplexer0 507 and to an input port of a data position multiplexer1 508. Like the cache data multiplexers 509 and 510, the data position multiplexers 507 and 508 are conventional multiplexers. The output port of the word2 data register 504 is likewise connected to an input port of the data position multiplexer0 507 and to an input port of the data position multiplexer1 508. In a similar manner, the system address and data bus 107 is connected to the input port of a conventional word1 data register 505 and to the input port of a conventional word3 register 506. The output port of each of the registers 505 and 506 is connected to an input port of each of the data position multiplexers 507 and 508. The output port of the multiplexer0 507 is connected to an input port of the cache data multiplexer0 509, and the output port of the data position multiplexer1 508 is connected to an input port of the cache data multiplexer1 510. In turn, the output port of the cache data multiplexer0 509 is connected to the cache data bus0 112, and the output port of the cache data multiplexer1 510 is connected to the cache data bus1 113. The cache data multiplexers 509 and 510 are controlled by the micro R/W line 105 and are enabled and disabled by the CDEN line. The operation of the data position multiplexers 507 and 508 is controlled by DPMS0 and DPMS1 signal lines from the sequencer 400.

The operation of the interface 500 is as follows. When the CPU 100 requests a word to be read, the READ signal on the micro R/W line 105 appears at the multiplexers 509 and 510. But the interface 500 does not undertake action in response to the READ signal unless and until it receives a BLOCK READ signal on a block read (BLKR) signal line from the sequencer 400. The BLOCK READ signal is generated by the sequencer 400 when a cache miss occurs. At that time, the CDEN line is also set high to enable the cache data multiplexers 509 and 510.

The enabled multiplexers 509 and 510 respond to the READ signal on the micro R/W line 105 by connecting the outputs of the data position multiplexers 507 and 508, respectively, to the cache data buses 112 and 113, respectively. The interface 500 responds to the BLOCK READ signal by latching in the address out latch 502 the signals appearing on the micro address bus 103, which signals represent the address of the desired word 160. The interface 500 then takes necessary steps to gain use of the system bus 110. When it has gained use of the bus 110, the interface 500 gates the address of the desired word 160 from the address out latch 502 onto the system address and data bus 107, and also issues a BLOCK READ command on the system command bus 109.

The main memory 102 responds to the address and command on the system bus 110 by performing a block transfer of the block 150 that includes the addressed word 160. The main memory 102 performs the block transfer in two successive double-word transfers over the system data bus 108 and the system address and data bus 107. The first double word comprises the first two words 0 and 1 of the block 150 and the second double-word comprises the last two words 2 and 3 of the block 150.

Word 0 of the block 150 arrives to the interface 500 on the system data bus 108 and is latched by the word0 data register 503. Simultaneously, word 1 of the block 150 arrives on the system address and data bus 107 and is latched by the word1 data register 505. Thereafter, during the second double-word transfer, the words 2 and 3 of the block 150 arrive simultaneously, on the system data bus 108 and the system address and data bus 107, respectively, and are latched by the word2 data register 504 and the word3 data register 506, respectively. Following receipt of the block 150, the interface 500 asserts a DATARET signal line leading to the sequencer 400 to indicate that the requested block 150 of data has been returned by the main memory 102 and has been latched by the interface 500.

Which of the received double-words is passed first to the cache data storage 300 for storing depends on which of the double-words includes the desired word 160. The double-word that includes the desired word is passed last. This is accomplished under control of the sequencer 400 via the signal line DPMS1 that controls the operation of the data position multiplexers 507 and 508. Which multiplexer 507 and 508 passes the even words 0 and 2 of the received block 150 and which passes the odd words 1 and 3 is also determined by the sequencer 400, via the signal line DPMS0 that likewise controls the operation of the data position multiplexers 507 and 508. If set 0 is being updated, the multiplexer 507 passes words 0 and 2 of received the block 150 and the multiplexer 508 passes words 1 and 3 of the received block 150. If set 1 is being updated, the multiplexer 507 passes words 1 and 3 and the multiplexer 508 passes words 0 and 2. As was mentioned above, the READ signal on the micro R/W line 105 from the CPU caused the cache data multiplexers 509 and 510 to select the outputs of the data position multiplexers 507 and 508 for connection to the cache bus 111, and hence the words 160 that are passed by the multiplexers 507 and 508 are routed by the cache bus 111 to the DATA ports of the cache data storage 300. Thereafter, when the CDEN line goes low, the cache data multiplexers 509 and 510 are disabled and cease to connect the outputs of the data position multiplexers 507 and 508 to the cache data bus 111.

When the CPU 100 performs a write of a memory word 160, a high signal on the CDEN line and the WRITE signal on the micro R/W line 105 cause the multiplexers 509 and 510 to connect the micro data bus 104 to the cache data buses 112 and 113. The word 160 of data that is to be written is thus gated to the DATA ports of both memory parts 301 and 302 of the cache data storage 300. The interface 500 further responds to the WRITE signal by receiving the desired word's address from the micro address bus 103 and latching it into the address output latch 502, and by receiving the word 160 from the micro data bus 104 and latching it into the data output latch 501. The interface 500 then takes the necessary steps to gain use of the system bus 110. When it has gained use of the bus 110, the interface 500 gates the desired word's address from the address out latch 502 onto the system address and data bus 107, gates the word 160 from the data out latch 501 onto the system data bus 108, and generates a WRITE command on the system command bus 109. The main memory 102 responds to the signals on the system bus 110 by writing the desired word 160 in the main memory 102.

Figure 7:
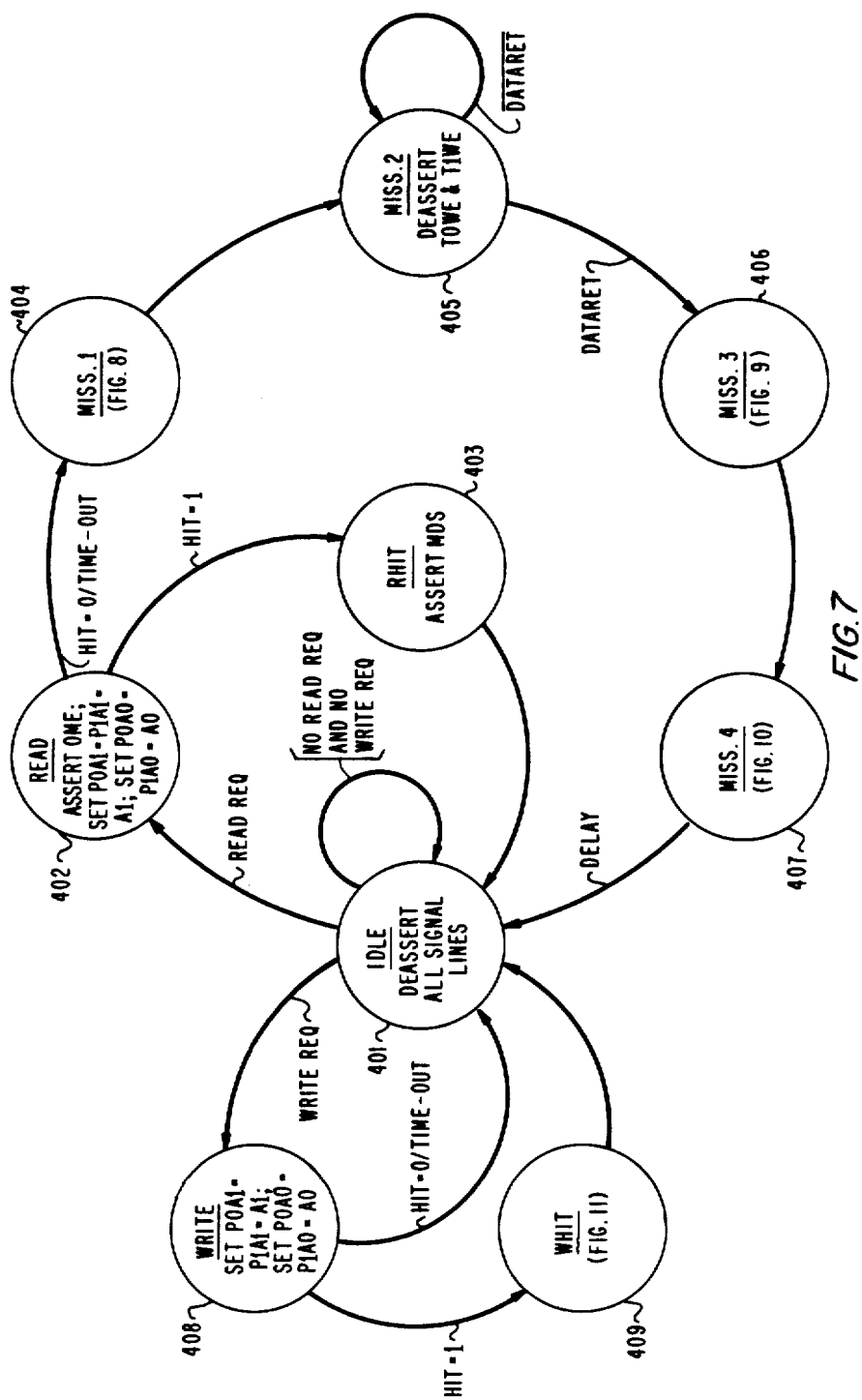
FIG. 7 is a state diagram of the sequencer of the cache memory of FIG. 1.
Figure 8:
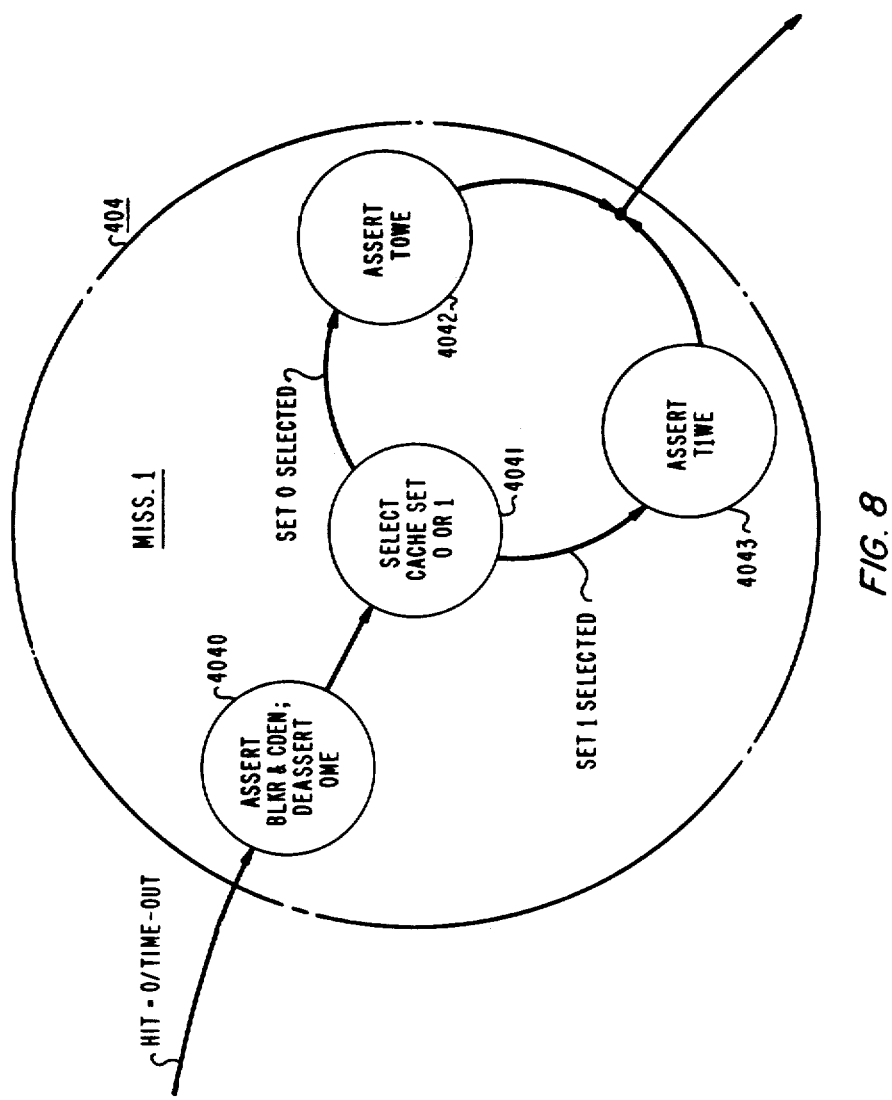
FIG. 8 is a stage diagram of the state MISS.1 of FIG. 7.
Figure 9:
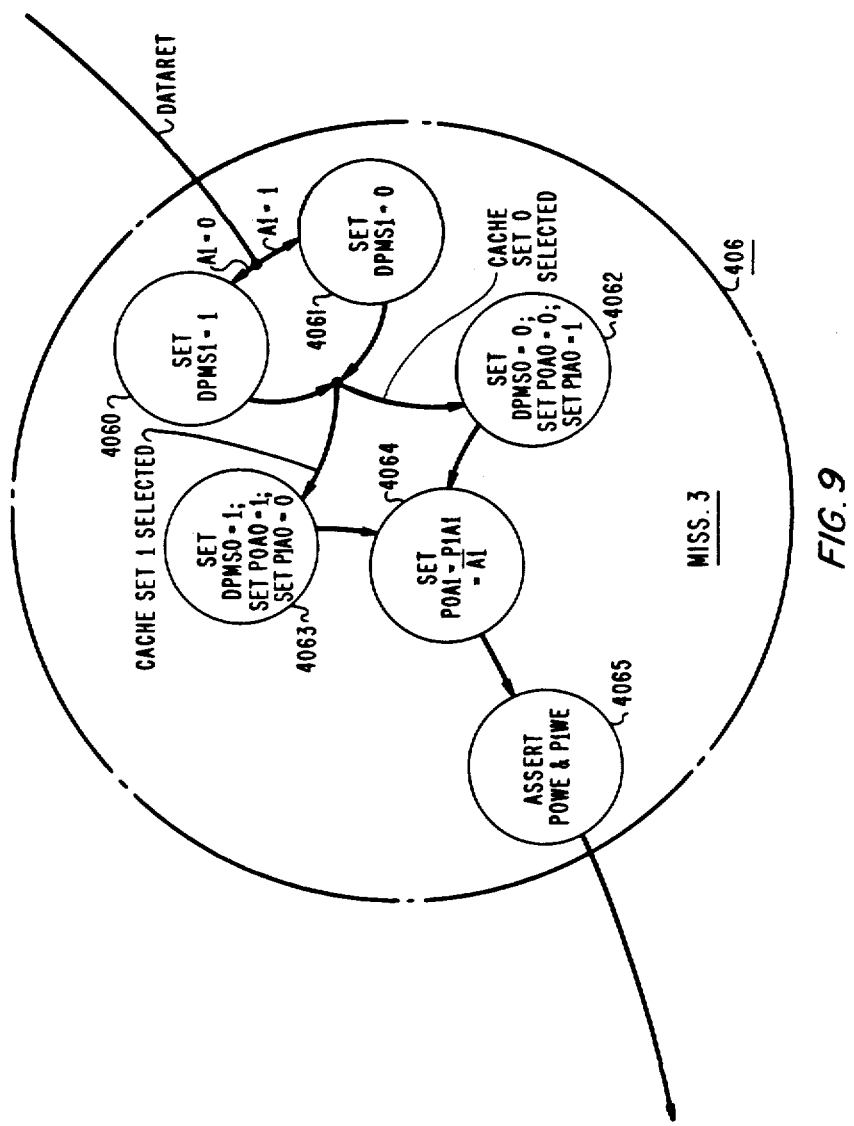
FIG. 9 is a stage diagram of the state MISS.3 of FIG. 7.
Figure 10:
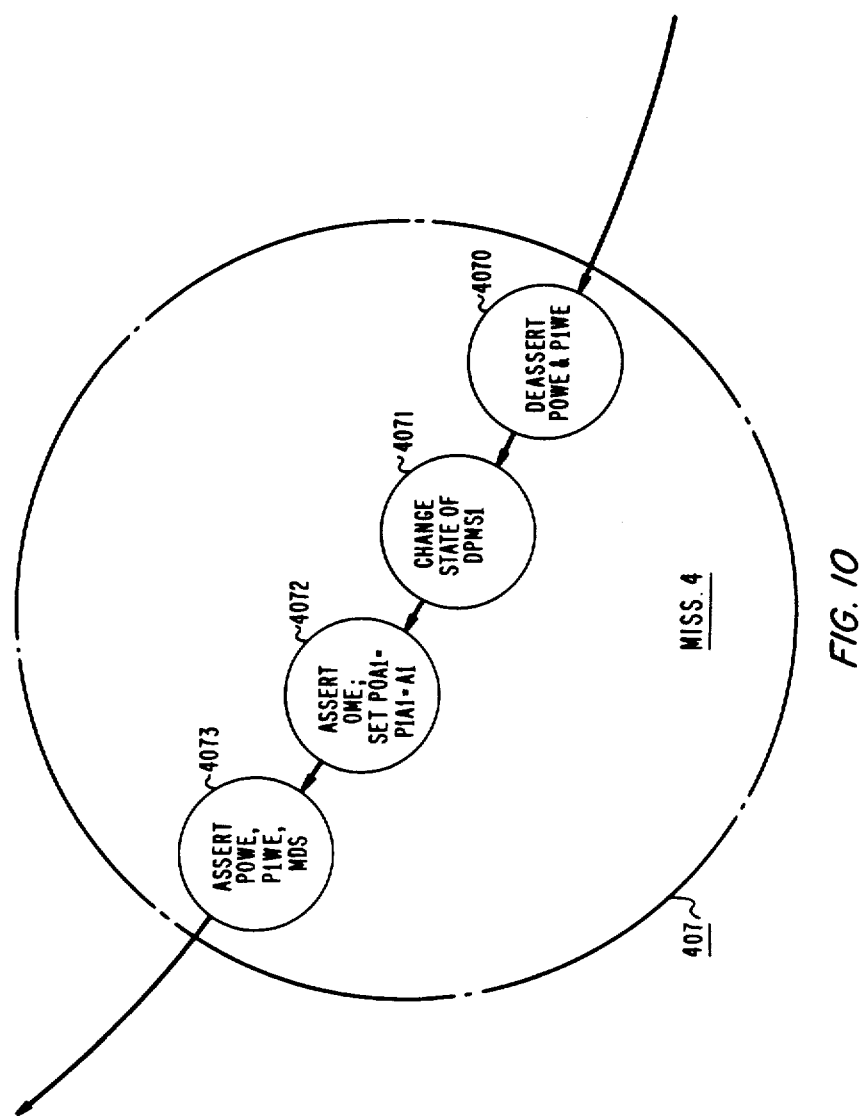
FIG. 10 is a stage diagram of the state MISS.4 of FIG. 7.
Figure 11:
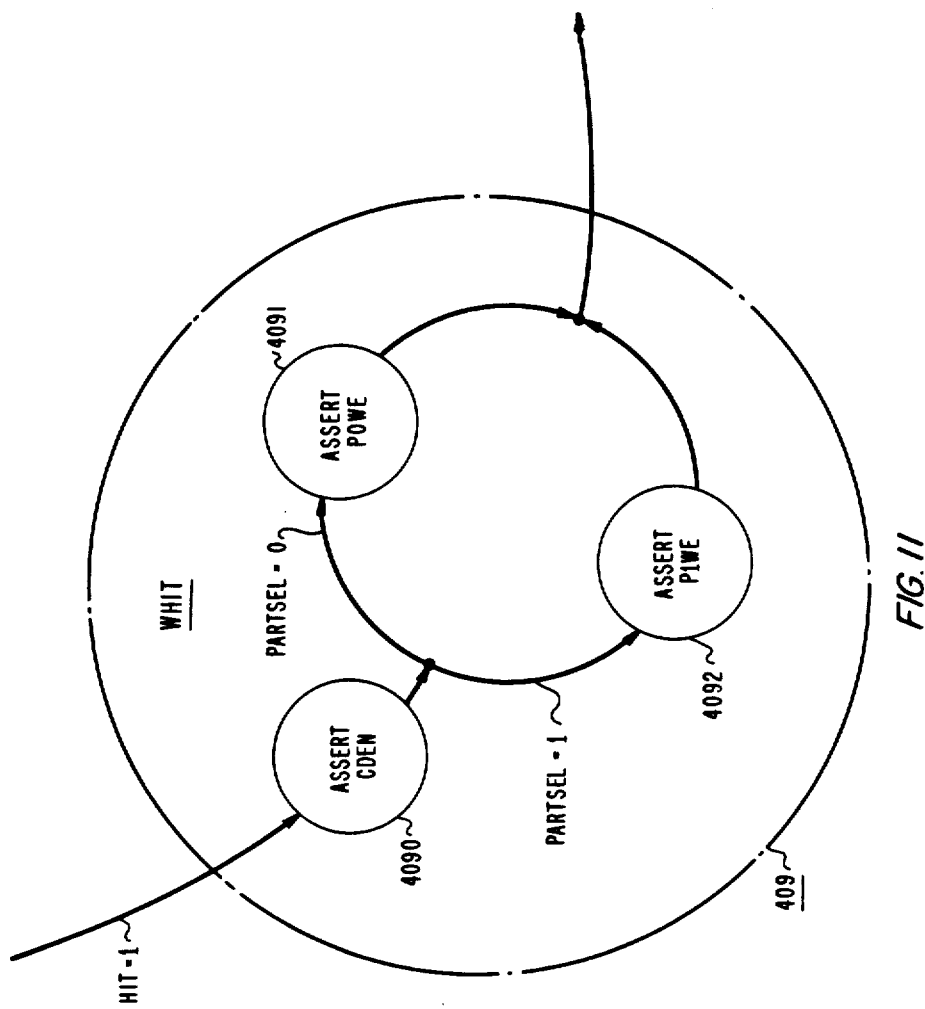
FIG. 11 is a stage diagram of the state WHIT of FIG. 7.

FIG. 7 diagrams the operation of the sequencer 400 that controls the operation of the cache memory 101. The sequencer 400 is substantially a state machine that coordinates the assertion and deassertion of control signals. The state machine is defined by the state diagram of FIG. 7. The state diagram of FIG. 7 represents the operations, and their sequence, performed by the sequencer 400.

As FIG. 7 shows, the sequencer 400 stays in IDLE state 401 while the CPU 100 is not making read or write requests. In the IDLE state 401, signal lines controlled by the sequencer 400 are deasserted. In particular, the T0WE, T1WE, P0WE, and P1WE signal lines are deasserted to cause the contents of the addressed locations 203 of the tag stores 201 and 202 and the addressed locations 303 of the memory parts 301 and 302 to be read out in anticipation of a read operation.

When the CPU 100 requests a read operation, the sequencer 400 responds by leaving the IDLE state 401 and entering the READ state 402. In the READ state 402 the sequencer 400 asserts the output multiplexer enable (OME) line to enable the output multiplexer 115 (see FIG. 1) to pass data from the cache bus0 112 or the cache bus1 113, as dictated by the PARTSEL line, to the micro data bus 104. The sequencer 400 also sets the signal values of the signal lines P0A0 and P1A0 to equal the signal value of the address bit line A0 of the micro address bus 103, and sets the signal values of the signal lines P0A1 and P1A1 to equal the signal value of the address bit line A1. The sequencer 400 then awaits the results of the bit check at the comparators 208 and 210 (see FIG. 4).

Which state the sequencer 400 enters next is dependent on the status of the HIT signal line from the cache tag storage and hit detection logic 300 (see FIG. 4). If the HIT signal line is asserted high, indicating a cache hit, the sequencer 400 enters RHIT state 403, wherein it asserts the micro data strobe (MDS) line 109 of the micro bus 106 (see FIG. 1) to signal the CPU 100 that the requested word 160 is available on the micro data bus 104. Following a delay to enable the CPU 100 to accept the word 160 from the bus 140, the sequencer 400 returns to the IDLE state 401 wherein it deasserts the OME and MDS signal lines.

If in the READ state 402 the HIT signal line remains deasserted for a predetermined period of time, indicating a cache miss, the sequencer 400 enters state MISS.1 404. The state 404 is characterized by a series of stages 4040–4043. In the first stage 4040 of the state 401, the sequencer 400 asserts the CDEN signal line to enable the cache data multiplexers 509 and 510, and also asserts the BLOCKR signal line to cause the interface 500 to latch the address of the desired word from the micro address bus 103 and request a block transfer from the main memory 102. Also in the stage 4040, the sequencer 400 deasserts the OME signal line to disconnect the cache bus 111 from the micro data bus 104. The sequencer 400 then enters stage 4041, wherein it selects one of the cache sets 0 and 1 to be the recipient of the block 150 that is being transferred in from the main memory 102. The selection is made on a random basis in this example; however, various other cache replacement algorithms are known to the art and any one of these may be used to select among the cache sets 0 and 1. Depending upon the selection, the sequencer 400 enters either stage 4042 or 4043 and asserts the T0WE or T1WE signal line to write the new block's tag into the tag store of the selected cache set. If cache set 0 was selected for replacement, stage 4042 is entered and T0WE is asserted; if cache set 1 was selected for replacement, stage 4043 is entered and T1WE is asserted.

The sequencer 400 next makes a transition to the state MISS.2 405. In this state the sequencer 400 deasserts the T0WE and T1WE signal lines. The sequencer 400 then awaits assertion by the interface 500 of the DATARET signal line indicating that the requested block 150 has arrived from the main memory 102.

On assertion of the DATARET line, the sequencer 400 goes to state MISS.3 406. This state is again characterized by a plurality of stages 4060–4065. Depending on whether the requested word 160 is in the first or second double-word of the block 150, as indicated to the sequencer 400 by the value of the second least significant address bit of the word's address carried by the address bit line A1, the sequencer 400 enters either stage 4061 or 4062. If the requested word 160 is in the first double-word, indicated by the second least significant address bit being zero, the sequencer 400 enters stage 4060 and sets the DPMS1 signal line to a logical high state to cause the multiplexers 507 and 508 to transfer the second double-word to the cache data storage 300 first. If the requested word 160 is in the second double-word, indicated by the second least significant address bit being one, the sequencer 400 enters stage 4061 and sets the DPMS1 signal line to the logical low state to cause the multiplexer 507 and 508 to transfer the first double-word to the cache data storage 300 first.

Next, the sequencer 400 enters either stage 4062 or stage 4063, depending on whether it selected a frame 170 of the cache set 0 or of the cache set 1 for replacement. If set 0 was selected, the sequencer 400 enters stage 4062 and sets the DPMS0 signal line to the logical low state to cause the even words 0 and 2 of the received block 150 to be passed by the data position multiplexer0 507 to the part0 data storage 301 and the odd words 1 and 3 to be passed by the data position multiplexer1 508 to the part1 data storage 302. In the stage 4062 the sequencer 400 also sets the P0A0 signal line to a signal value of zero and the P1A0 signal line to a signal value of one, to cause the even words 0 and 2 of the received block 105 to be stored in even-numbered locations 303 of the part0 data storage 301 and to cause the odd words 1 and 3 of the received block 150 to be stored in odd-numbered locations 303 of the part1 data storage 302.

Conversely, if a frame 170 of cache set 1 was selected for replacement, the sequencer 400 enters stage 4063 and sets the DPMS0 signal line to the logical high state to cause the even words 0 and 2 of the received block 150 to be passed by the data position multiplexer1 508 to the part1 data storage 302 and the odd words 1 and 3 to be passed by the data position multiplexer0 507 to the part0 data storage 301. In the stage 4063 the sequencer 400 also sets the P0A0 signal line to a signal value of one and the P1A0 signal line to a signal value of zero, to cause the even words 0 and 2 of the received block to be stored in even-numbered locations 303 of the part1 data storage 302 and to cause the odd words 1 and 3 of the received block 150 to be stored in the odd-numbered locations 303 of the part0 data storage 301.

Next, the sequencer 400 enters stage 4064 of the state 406, wherein it sets the signal lines P0A1 and P1A1 to the converse of the value of the second least significant bit of the desired word's address, indicated by address bit line A1, to reflect the fact that the double-word not containing the desired word 160 is being stored in the cache data storage 300. Then the sequencer 400 enters stage 4065 wherein it asserts the P0WE and P1WE signal lines to cause the double-word to be stored in the cache data storage 300.

Having stored one double-word of the received block 150, the sequencer 400 enters state MISS.4 407 to store the other double-word. Again passing through a plurality of stages, the sequencer 400 first enters stage 4070 and deasserts the P0WE and P1WE signal lines. Next, the sequence 400 enters stage 4071 and changes the state of the DPMS1 signal line, to cause the multiplexers 507 and 508 to channel the other double-word of the received block 150 onto the cache bus 111. As this double-word contains the desired word 160, the sequencer 400 enters stage 4072 and asserts the OME signal line to cause the output multiplexer 115 to channel the desired word 160 onto the micro data bus 104. Selection of the desired word 160 from the double-word is made at the output multiplexer 115 by the state of the PARTSEL signal line. In the stage 4072 the sequencer 400 also sets the P0A1 and P1A1 signal lines to the value of the second least significant bit of the desired word's address, indicated by the address bit line A1, to reflect the fact that the double-word including the desired word 160 is being stored in the cache data storage 300. Then the sequencer 400 enters stage 4073 of the state 407 and asserts the P0WE and P1WE signal lines to cause the double-word to be written in the cache data storage 300. And the sequencer 400 also asserts the micro DS line 109 of the micro bus 106 to inform the CPU 100 that the desired word 106 is now available on the micro data bus 104.

The cache update having been completed, the sequencer 400 delays and then reenters the IDLE state 401 and deasserts all signal lines controlled by it.

When the CPU 100 requests a write operation, the sequencer 400 responds to the WRITE signal appearing on the micro R/W line 105 by leaving the IDLE state 401 and entering the WRITE state 408. In the state 408 the sequencer 400 sets the signal values of the P0A0 and P1A0 signal lines to equal the value of the least significant bit of the desired word's address, indicated by the address bit line A0, and sets the signal values of the P0A1 and P1A1 signal lines to equal the value of the second least significant bit of the desired word's address, indicated by the address bit line A1. The sequencer 400 then awaits the results of the hit check at the comparators 208 and 210 (see FIG. 4).

Which state the sequencer 400 enters next is dependent on the status of the HIT signal line from the cache tag storage and hit detection logic 300 (see FIG. 4). If the HIT signal line remains deasserted for a predetermined period of time, indicating a cache miss, the sequencer 400 merely reenters the IDLE state 401 and deasserts the signal lines that it previously asserted.

If, however, the HIT signal line is asserted high, indicating a cache hit, the sequencer 400 enters WHIT state 409. This state is characterized by three stages 4090-4092. The sequencer 400 first enters stage 4090 and asserts the CDEN signal line to enable the cache data multiplexers 509 and 510. The sequencer 400 then enters one of two alternative stages 4091 and 4092. Which of the two stages 4091 and 4092 the sequencer 400 enters is dependent upon the state of the PARTSEL signal line. If the PARTSEL signal line is low, indicating a hit on memory part 301, the sequence 400 enters stage 4091 and asserts the P0WE signal line to cause the addressed location 303 of the part 301 to be written with new data from the cache bus 111. If the PARTSEL signal line is high, indicating a hit on memory part 302, the sequencer 400 enters stage 4092 and asserts the P1WE signal line to cause the addressed location 303 of the part 302 to be written with new data from the cache bus 111.

The writing of the cache data storage 300 being completed, the sequencer 400 now returns to the IDLE state 401 and deasserts any signal lines that it has previously asserted.

Of course, various changes and modifications to the illustrative embodiment described above will be apparent to those skilled in the art. For example, the concept illustrated here with a two-way interleaved 2-way set associative cache memory can easily be extended to any M-way set-associative cache memory capable of receiving N memory words simultaneously, for example by virtue of being connected to an N-word wide data transfer bus. Such a cache memory comprises the greater of M and N memory parts, configured such that the N memory words 160 are simultaneously written each into a different memory part, and such that the words 180 of the M cache sets that can store a given memory word 160 are each located in a different memory part so as to be simultaneously accessible. Such changes and modifications can be made without departing from the spirit and the scope of the invention and without diminishing its attendant advantages. It is therefore intended that such changes and modifications be covered by the following claims.

What is claimed is:

1. An associative memory comprising:
   a plurality of memory parts each including a plurality of memory locations each for storing a word of information, the locations of the plurality of memory parts being grouped into a plurality of levels and each level having a location from each of the memory parts, each location of a level for storing any word of a plurality of words associated with that level, the plurality of parts defining a plurality of frames, each frame defined by a plurality of locations each from a different level, a frame for storing any block of words of a plurality of blocks, each block having a plurality of words each associated with a different level;
   means for storing a plurality of words simultaneously, each word into a location of the associated level and of a different memory part; and
   means for checking for presence of a desired word simultaneously in all locations of the level associated with the desired word.

2. The apparatus of claim 1 wherein the means for storing comprise:
   means for receiving a plurality of words simultaneously; and
   means for storing the received words simultaneously, each word into a location of a different memory part and of the associated level.

3. The apparatus of claim 2 wherein wherein
   the receiving means comprise
   means for simultaneously receiving a plurality of contiguous words; and wherein
   the storing means comprise
   means for storing the received words simultaneously, each word into a location of a different memory part and of a different level.

4. The apparatus of claim 1 further comprising:
   means for accessing all locations of a level simultaneously.

5. The apparatus of claim 1 further comprising:
   means operative simultaneously with the checking means for simultaneously accessing all locations of the checked level.

6. A set-associative cache memory comprising:
   a plurality of memory parts each including a plurality of memory locations each for storing a word of information, the locations of the plurality of memory parts being grouped into a plurality of levels and each level having a location from each of the memory parts, each location of a level for storing any word of a plurality of words associated with that level, the plurality of parts defining a plurality of sets of frames, each frame defined by a plurality of locations each from a different level, a frame of each set for storing any block of words of a plurality of blocks, each block having a plurality of words each associated with a different level;
   means for storing a plurality of words of a block simultaneously into one of the associated frames, each word in a location of the associated level and of a different memory part; and
   means for checking for presence of a desired word simultaneously in all locations of the level associated with the desired word.

7. The apparatus of claim 6 wherein the means for storing comprise:
   means for receiving a plurality of contiguous words of a block simultaneously; and
   means for storing the received words simultaneously.

8. The apparatus of claim 7 wherein
   the receiving means comprise
   means for receiving a first plurality of contiguous words of a block simultaneously, and for receiving a second plurality of contiguous words of the block simultaneously; and wherein
   the storing means comprise
   means for selecting one of the frames associated with the block, and
   means for storing one of the received pluralities of words into the selected frame simultaneously, each word into a location of the associated level and of a different memory part, and for storing the other of the received pluralities of words into the selected frame simultaneously, each word into a location of the associated level and of a different memory part.

9. The apparatus of claim 6 further comprising:
   means for simultaneously accessing all locations of a level associated with the desired word.

10. The apparatus of claim 6 further comprising:
    means operative simultaneously with the checking means for simultaneously accessing all locations of the checked level.

11. A two-way set-associative two-way interleaved cache memory comprising:
    a pair of memory parts each comprising a plurality of storage locations each for storing a word of information, the locations of one memory part defining even locations of a first cache set of a plurality of locations and odd locations of a second cache set of a plurality of locations and the other memory part defining odd locations of the first cache set and even locations of the second cache set, the locations of the pair of memory parts being grouped into at least four levels and each level having a location from each of the memory parts and each of the cache sets;

means for receiving simultaneously a first pair of contiguous words of a block of four contiguous words, and for receiving simultaneously a second pair of contiguous words of the block;

means for storing one pair of the received words simultaneously into locations of one cache set, each word into a location of a different memory part and of a different level of first and second levels, and for storing the other pair of received words simultaneously in locations of the one cache set, each word into a location of a different memory part and of a different level of third and fourth levels; and means for simultaneously checking all locations of a level for presence therein of a desired word.

12. The apparatus of claim 11 further comprising:
means for simultaneously accessing all locations of a level associated with the desired word.

13. The apparatus of claim 11 further comprising:
means operative simultaneously with the checking means for simultaneously accessing all locations of the checked level.

14. A processing system comprising
a main memory for storing a plurality of words of information,
a cache memory for storing selected ones of the main memory words, and
a communication bus for transferring simultaneously a plurality of words from the main memory to the cache memory,
the cache memory comprising:
a plurality of memory parts each including a plurality of memory locations each for storing a word, the locations of the plurality of memory parts being grouped into a plurality of levels and each level having a location from each of the memory parts, each location of a level for storing any word of a plurality of words associated with that level, the plurality of parts defining a plurality of frames, each frame defined by a plurality of locations each from a different level, a frame for storing any block of words of a plurality of blocks, each block having a plurality of words each associated with a different level;
means for receiving from the bus a plurality of words simultaneously;
means for storing the received words simultaneously, each word into a location of the associated level and of a different memory part; and
means for checking for presence of a desired word simultaneously in all locations of the level associated with the desired word.

15. The apparatus of claim 14 wherein
the receiving means comprise
means for simultaneously receiving a plurality of contiguous words; and wherein
the storing means comprise
means for storing the received words simultaneously, each word into a location of a different memory part and of a different level.

16. The apparatus of claim 14 further comprising:
means for accessing all locations of a level simultaneously.

17. The apparatus of claim 14 further comprising:
means operative simultaneously with the checking means for simultaneously accessing all locations of the checked level.

18. A processing system comprising
a main memory for storing a plurality of words of information,
a set-associative cache memory for storing selected ones of the main memory words, and
a communication bus for transferring simultaneously a plurality of words from the main memory to the cache memory,
the cache memory comprising:
a plurality of memory parts each including a plurality of memory locations each for storing a word, the locations of the plurality of memory parts being grouped into a plurality of levels and each level having a location from each of the memory parts, each location of a level for storing any word of a plurality of words associated with that level, the plurality of parts defining a plurality of sets of frames, each frame defined by a plurality of locations each from a different level, a frame of each set for storing any block of a plurality of blocks associated with those frames, each block having a plurality of words;
means for receiving from the bus a plurality of words of a block simultaneously;
means for storing the received words simultaneously into one of the associated frames, each word into a location of the associated level and of a different memory part; and
means for checking for presence of a desired word in all locations of the level associated with the desired word simultaneously.

19. The apparatus of claim 18 wherein
the receiving means comprise
means for receiving a first plurality of contiguous words of a block simultaneously, and for receiving a second plurality of contiguous words of the block simultaneously; and wherein
the storing means comprise
means for selecting one of the frames associated with the block, and
means for storing one of the received pluralities of words into the selected frame simultaneously, each word into a location of the associated level and of a different memory part, and for storing the other of the received pluralities of words into the selected frame simultaneously, each word into a location of the associated level and of a different memory part.

20. The apparatus of claim 18 further comprising:
means for simultaneously accessing all locations of a level associated with the desired word.

21. The apparatus of claim 18 further comprising:
means operative simultaneously with the checking means for simultaneously accessing all locations of the checked level.

22. A processing system comprising
a main memory for storing a plurality of blocks of four contiguous words of information,
a two-way set-associative two-way interleaved cache memory for storing selected ones of the main memory blocks, and
a communication bus for transferring in parallel a pair of words of a block from the main memory to the cache memory, the cache memory comprising:

a pair of memory parts each comprising a plurality of memory locations each for storing a word, the locations of one memory part defining even locations of a first cache set of a plurality of locations and odd locations of a second cache set of a plurality of locations and the other memory part defining odd locations of the first cache set and even locations of the second cache set, the locations of the pair of memory parts being grouped into at least four levels and each level having a location from each of the memory parts and each of the cache sets;

means for receiving simultaneously from the bus a first pair of contiguous words of a block, and for receiving simultaneously a second pair of contiguous words of the block;

means for storing one pair of the received words simultaneously into locations of one cache set, each word into a location of a different memory part and of a different level of first and second levels, and for storing the other pair of received words simultaneously in locations of the one cache set, each word into a location of a different memory part and of a different level of third and fourth levels; and means for simultaneously checking all locations of a level for presence therein of a desired word.

23. The apparatus of claim 22 further comprising:
means for simultaneously accessing all locations of a level associated with the desired word.

24. The apparatus of claim 22 further comprising:
means operative simultaneously with the checking means for simultaneously accessing all locations of the checked level.

* * * * *